United States Patent [19]

Relf

[11] Patent Number: 5,583,899

[45] Date of Patent: Dec. 10, 1996

[54] REMOVABLE RETROFIT SHROUD FOR A BOILING WATER NUCLEAR REACTOR AND ASSOCIATED METHOD

[75] Inventor: Charles W. Relf, Fremont, Calif.

[73] Assignee: General Electric Company, Schenectady, N.Y.

[21] Appl. No.: 373,377

[22] Filed: Jan. 17, 1995

[51] Int. Cl.[6] .................................................. G21C 15/00
[52] U.S. Cl. ........................ 376/287; 376/285; 376/302; 376/372
[58] Field of Search ................................... 376/285, 287, 376/302, 370, 372, 461

[56] References Cited

U.S. PATENT DOCUMENTS

| | | | |
|---|---|---|---|
| 3,627,634 | 12/1971 | Guenther | 376/203 |
| 3,785,924 | 1/1974 | Notari | 376/287 |
| 4,299,658 | 11/1981 | Meuschke et al. | 376/260 |
| 4,315,800 | 2/1982 | Yoshimoto et al. | 376/246 |
| 4,409,179 | 10/1983 | Burger | 376/287 |
| 4,842,806 | 6/1989 | Ohtomi | 376/247 |
| 5,073,335 | 12/1991 | Townsend | 376/373 |
| 5,075,073 | 12/1991 | Dillmann | 376/352 |
| 5,082,620 | 1/1992 | Fennern | 376/372 |
| 5,118,461 | 6/1992 | Fujii | 376/246 |
| 5,120,493 | 6/1992 | Marquino et al. | 376/373 |
| 5,135,711 | 8/1992 | Borchardt et al. | 376/372 |
| 5,265,141 | 11/1993 | Kobsa | 376/463 |
| 5,303,275 | 4/1994 | Kobsa | 376/352 |
| 5,392,322 | 2/1995 | Whitling et al. | 376/302 |
| 5,426,675 | 6/1995 | Kumar et al. | 376/370 |

FOREIGN PATENT DOCUMENTS 2051780 4/1971 France .

OTHER PUBLICATIONS

"Recommendations On Inservice Inspection of BWR Internal Components and Attachments" presented to The ASME Section XI Subcommittee on Nuclear Inservice Inspection by the BWR Owner's Group; Apr. 1991.

Primary Examiner—Daniel D. Wasil
Attorney, Agent, or Firm—Nixon & Vanderhye P.C.

[57] ABSTRACT

In a pressure vessel of a nuclear reactor containing a core assembly enclosed within a core shroud, the shroud spaced radially inwardly of a side wall of the pressure vessel, and an annular pump deck welded in a place in an annular radial space between the core shroud and the side wall of the pressure vessel. The shroud provided with a radially outwardly extending flange seated on and removably secured to the pump deck. Wedge elements are interposed between flange portions and the side wall.

8 Claims, 6 Drawing Sheets

REMOVABLE RETROFIT SHROUD FOR A BOILING WATER NUCLEAR REACTOR AND ASSOCIATED METHOD

TECHNICAL FIELD

This invention relates to boiling water nuclear reactors and specifically, to a new shroud design for replacing damaged shrouds in existing boiling water nuclear reactor power plants.

BACKGROUND

Typical boiling water nuclear reactors include a reactor assembly which consists of the reactor vessel and its internal components including the core, core shroud, top guide assembly, core plate assembly, steam separator and dryer assemblies, and jet pumps. Also included in the reactor assembly are the control rods, control rod drive housings and the control rod drives.

The reactor vessel is a generally cylindrical pressure vessel (RPV) with a single full diameter removable head. The shroud is a cylindrical stainless steel structure located within the RPV and which surrounds the core, providing a barrier to separate the upward flow through the core from the downward flow in the annulus between the RPV wall and the core shroud. The core shroud supports the weight of the top guide, core plate and shroud head along with attached steam separators.

The discovery of unexpected circumferential cracks propagating through the thickness of the shrouds in relatively young operating BWR's has prompted a re-design of the core shrouds for future BWR's as well as replacement shrouds for existing damaged shrouds.

The primary cause of the observed cracking has been intergranular stress corrosion in the heat affected zones near many of the horizontal welds of the shroud and shroud supports. There have also been some cracks observed in the mid-belt regions of BWR shrouds, and these have been thought to be caused by irradiation assisted stress corrosion.

The conventional BWR shroud is permanently welded to the bottom of the vessel and is not intended to be removed or replaced. The shroud has various horizontal welds which are susceptible to the stress corrosion cracking problem. The shroud is also welded about its side wall to a pump deck which serves as a pressure boundary to separate the low pressure region of the annulus from the higher pressure region of the lower plenum. The pump deck section is also permanently welded in place between the shroud and the reactor pressure vessel, and it too is not intended to be removed or replaced. As with the shroud welds, the pump deck welds are also susceptible to stress corrosion cracking, but the pump deck is not considered as a critical support mechanism for the shroud. Accordingly, this invention relates to a replacement shroud for use with existing pump decks.

SUMMARY OF THE INVENTION

This invention relates to a new shroud design for replacing damaged shrouds in existing boiling water reactor (BWR) nuclear power plants. This "removable retrofit" shroud is designed to replace the damaged, welded in place type shrouds of operating BWR power plants as a feasible and practical solution to the current shroud cracking problems. This new replacement shroud is designed to be placed and fitted within a highly radioactive environment of a reactor vessel without requiring personnel to physically enter the reactor vessel and risk themselves to high radiation exposure. In addition, the new shroud has a simple fastening feature that provides a means for future removal and repair, or for complete replacement, again without requiring personnel to physically enter the reactor vessel.

In the exemplary embodiment, the removable retrofit shroud has a shape and size similar to that of the original core shroud, and there are no modifications required for other internal components such as the steam separator and dryer assemblies, etc.

An annular flange ring is welded to the lower edge of the axially shortened shroud, the flange ring extending in a radially outward direction. The annular flange ring is formed with a scalloped edge defining a series of radially outwardly extending flange portions of alternating relatively larger and smaller radial extent. At each flange portion, a bolt hole is provided relatively closely adjacent the shroud enabling the flange ring to be rigidly bolted to the pump deck. The larger radial flange portions extend radially outwardly to a location proximate the RPV wall and includes a tapered wedge-like key adapted to receive a wedge of the type described hereinabove, radially between the key and the RPV wall. Each wedge element is provided with a bail on its upper surface to facilitate remote installation and removal.

After the existing shroud support leg has been cut flush with the top of the pump deck and thereafter removed along with the damaged shroud, the new retrofit shroud can be placed and bolted to the top of the existing pump deck. The bolting restrains the shroud in the vertical direction and will thus transfer the vertical loads to the existing pump deck and shroud support legs. In the exemplary embodiment, ten wedge elements are then placed in circumferentially spaced locations (between pairs of jet pump diffusers) around the retrofit shroud and radially between the tapered keys and the RPV wall. The wedges serve as a mechanism to transfer the high horizontal loads of the core and shroud during a postulated "upset" condition to the RPV wall.

It will be appreciated that the new core shroud will also take on the configuration of the existing shroud at its upper end. In other words, it is possible to modify the upper section of the new shroud to incorporate and take advantage of the upper section configuration of either existing BWR shrouds, or the more modern type advanced boiling water reactors (ABWR) currently under construction.

Accordingly, in its broader aspects, the present invention relates to a pressure vessel of a nuclear reactor containing a core assembly enclosed within a core shroud, the core shroud spaced radially inwardly of a side wall of the pressure vessel with an annular pump deck welded in place in an annular radial space between the core shroud and the side wall of the pressure vessel, the improvement wherein the shroud is removably secured to the pump deck.

In another aspect, the invention relates to a method of replacing a damaged core shroud installed in a nuclear reactor pressure vessel containing a core assembly enclosed within a core shroud, the core shroud spaced radially inwardly of a side wall of the pressure vessel with an annular pump deck welded in a place in an annular radial space between the core shroud and the side wall of the pressure vessel, and with the shroud welded to an annular support leg extending upwardly from a lower end of the vessel to a height above the pump deck, comprising the steps of:

a) cutting the annular support leg at a height substantially flush with the pump deck;

b) removing the damaged core shroud and cut portion of the annular support leg from the core;

c) providing a core shroud having an outwardly directed mounting flange at its lowermost edge;

d) seating the mounting flange on the pump deck; and e) securing the mounting flange on the shroud to the pump deck.

With the above described arrangement, vertical loads on the shroud are transferred to the existing pump deck while horizontal loads are transferred to the RPV wall.

Other objects and advantages of the subject invention will become apparent from the detailed description which follows.

BEST MODE FOR CARRYING OUT THE INVENTION

Figure 1:
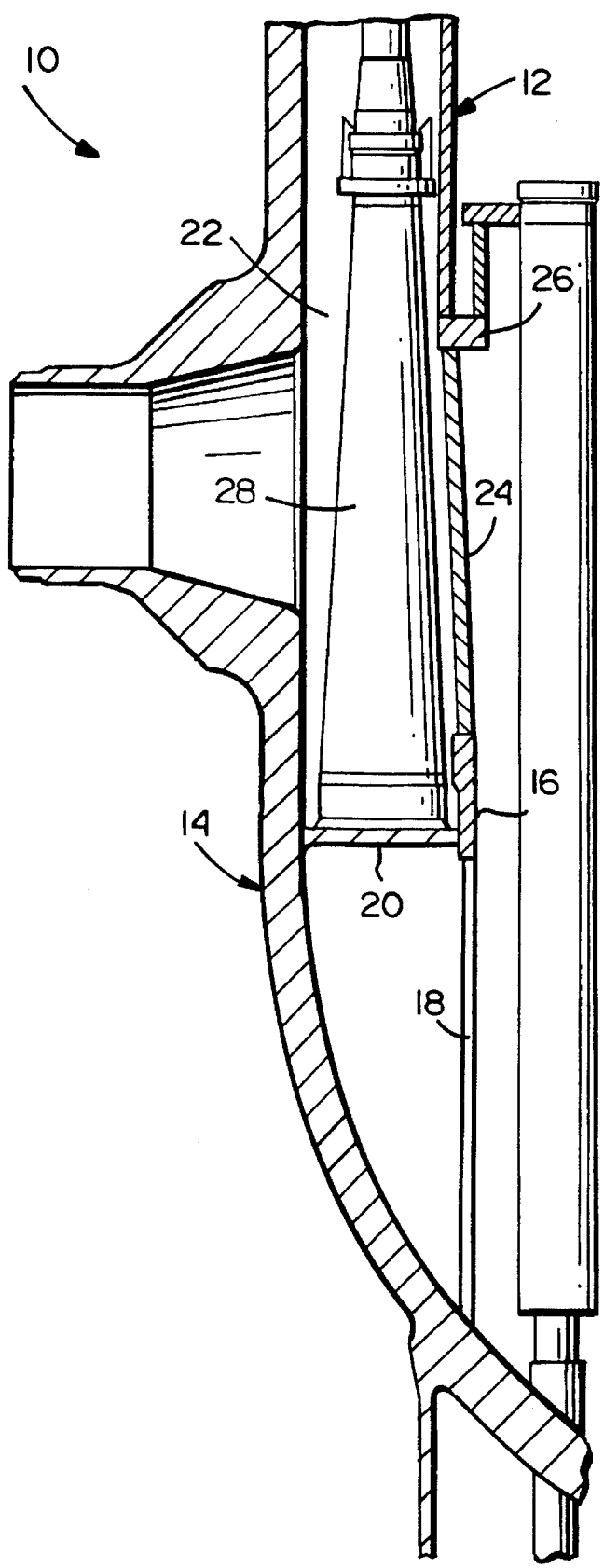
FIG. 1 is a partial side elevation, partly in section, illustrating a conventional boiling water reactor including a welded-in type core shroud and pump deck.

With reference to FIG. 1, a conventional BWR reactor 10 is partially illustrated which incorporates a welded-in type core shroud 12. The shroud 12 is welded in place within the reactor pressure vessel (RPV) 14. More specifically, the shroud 12 is welded to an annular support leg 16 welded to the lower portion of the RPV 14. The annular support leg 16 is provided with a flow opening 18 below the point at which pump deck 20 is welded between the RPV 14 and the shroud support leg 16. The annular space between the RPV and the shroud 12 is referred to herein as the annulus 22. As is well known, the shroud separates the upward flow within the core from the downward flow in the annulus.

The shroud 12 includes a thickened lower or base portion 24 and, at the juncture (or mid-belt) of shroud 12 and thickened lower base portion 24, there is welded in place an annular core support ring 26. A jet pump diffuser 28 is supported on the pump deck 20.

Figure 2:
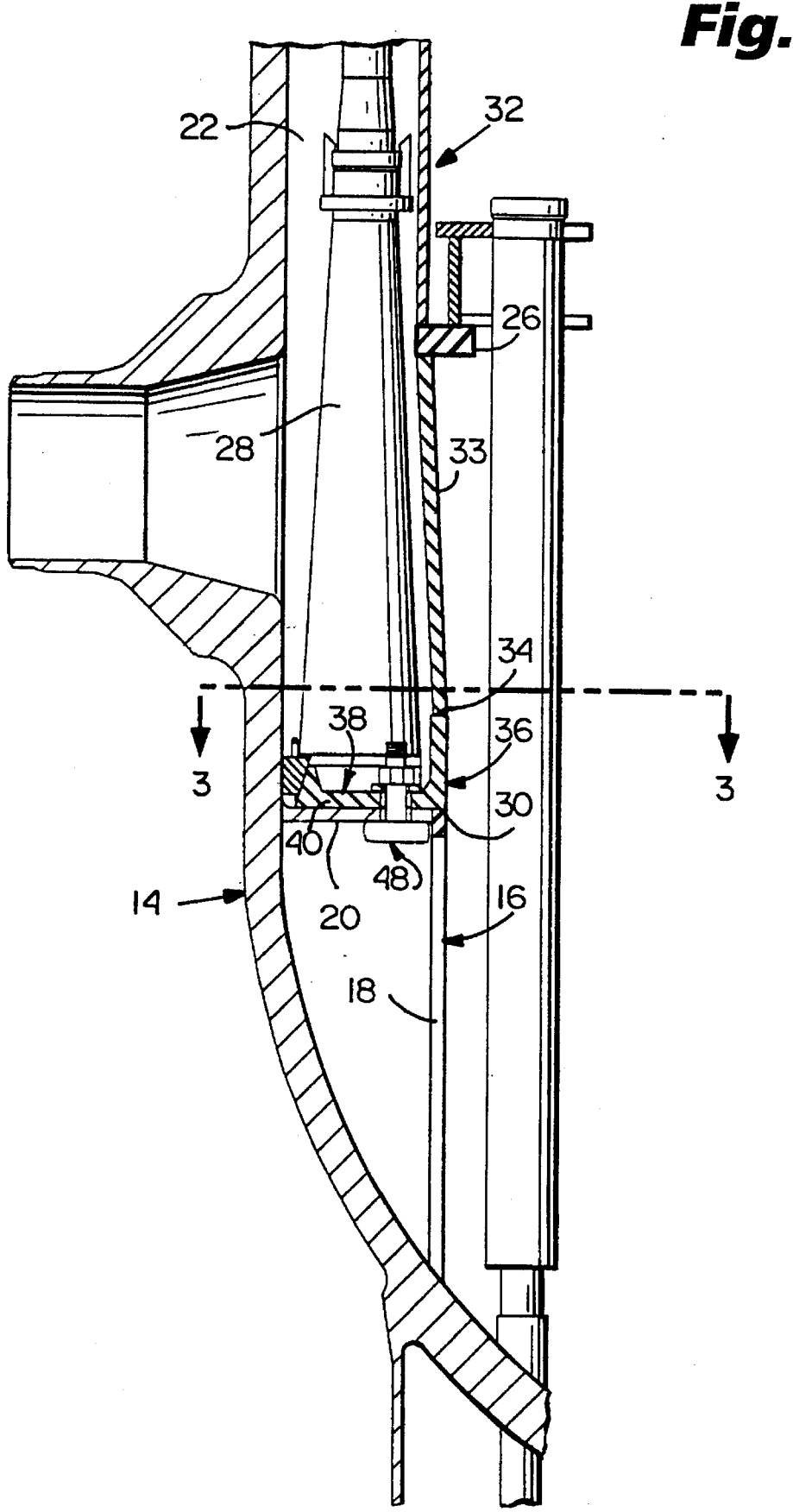
FIG. 2 is a section taken along the line 2—2 in FIG. 3, illustrating a removable retrofit shroud in accordance with this invention.

It may be seen that the shroud 12 and its base portion 24 includes various horizontal welds which are susceptible to intergranular stress corrosion cracking problems. In the event the shroud 12 and/or its base 24 becomes damaged via stress corrosion cracking, this invention allows a removable retrofit shroud to be located and secured in place within the RPV as a replacement for the damaged shroud. Thus, in accordance with this invention, the existing (permanent) support leg 16 is cut substantially flush with the surface of the pump deck (as shown at 30 in FIG. 2) enabling the existing shroud 12 and a portion of the support leg 16 to be removed from the core assembly. The new retrofit shroud 32 in accordance with this invention is shown in FIG. 2 and, except as noted below, is of substantially the same size and configuration as the removed shroud 12.

Figure 3:
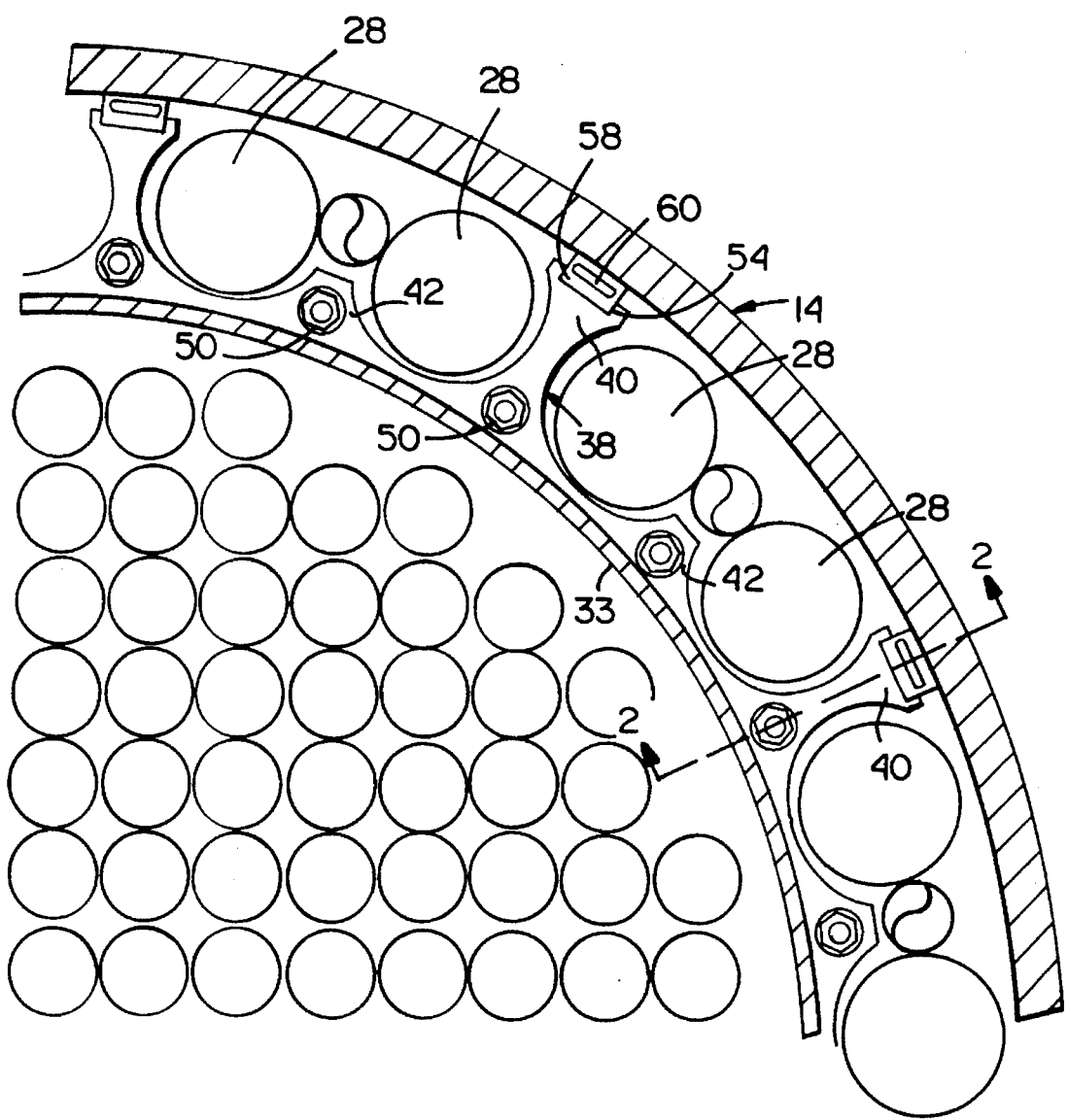
FIG. 3 is a section taken along the line 3—3 of FIG. 2.
Figure 4:
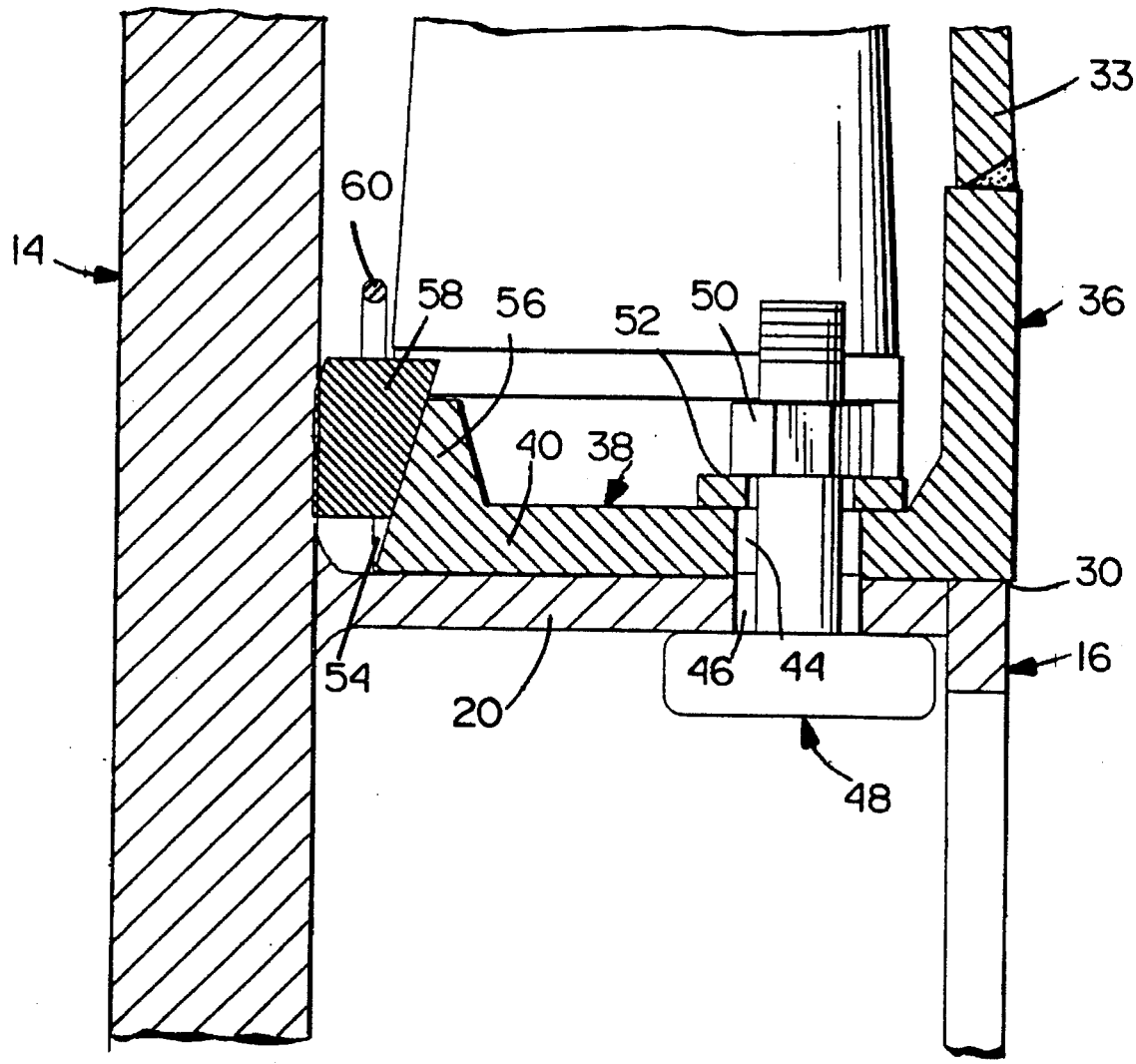
FIG. 4 is an enlarged detail taken from FIG. 2, and illustrating the fitment of the removable retrofit shroud to the existing pump deck.

The lower edge 34 of the new retrofit shroud 32 (and, specifically, the thickened lower base portion 33) has welded thereto a radial mounting ring 36 (preferably formed of Inconel) which includes a radially outwardly extending flange 38 which is adapted to seat on the existing pump deck 20 (and on the remaining portion of the original support leg 16). As best seen in FIGS. 3 and 4, the flange 38 of the ring 36 is scalloped about its outer edge, alternating horizontal transfer flange portions 40 extending substantially to the RPV wall, with radially shorter flange portions 42 extending less than half the annulus distance between the shroud 32 and the RPV wall. All of the flange portions 40 and 42 are provided with bolt holes 44 (See FIG. 4) which are alignable with newly drilled holes 46 in the pump deck 20, so that T-bolts 48 and associated nuts 50 and washers 52 may be utilized to secure the shroud 32 to the existing pump deck 20. In this manner, vertical loads on the shroud are transferred to the pump deck 20.

The radially larger transfer flange portions 40 are also provided with wedge mechanisms for final positioning and horizontal restraining of the retrofit shroud as described below. Again, with specific reference to FIGS. 3 and 4, each of the horizontal transfer flanges 40 terminates at a tapered (upwardly and inwardly) recess or key slot 54 which forms part of a tapered ridge 56 centered within the radially outermost edge of the flange 42. This tapered recess or key slot 54 is adapted to receive a wedge element 58, inserted from above, and wedged in between the ridge 56 and the RPV side wall. A bail 60 on each wedge element 58 facilitates removal of the wedge elements 58 via remote tooling. It will be appreciated that these wedge elements 58 serve to transfer high horizontal loads on the core and shroud to the RPV wall.

Figure 5:
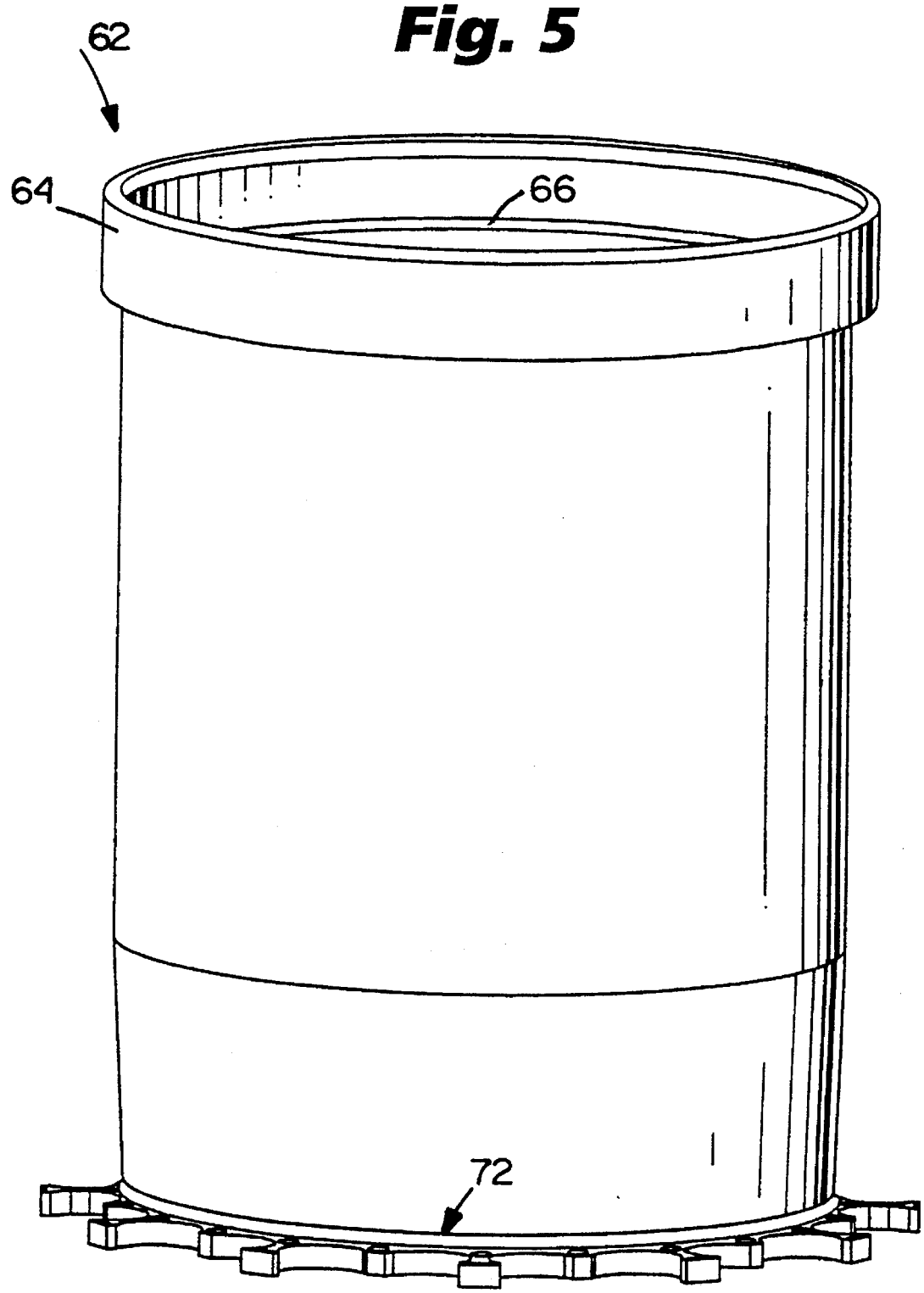
FIG. 5 is a perspective view of a removable retrofit shroud in accordance with this invention.
Figure 6:
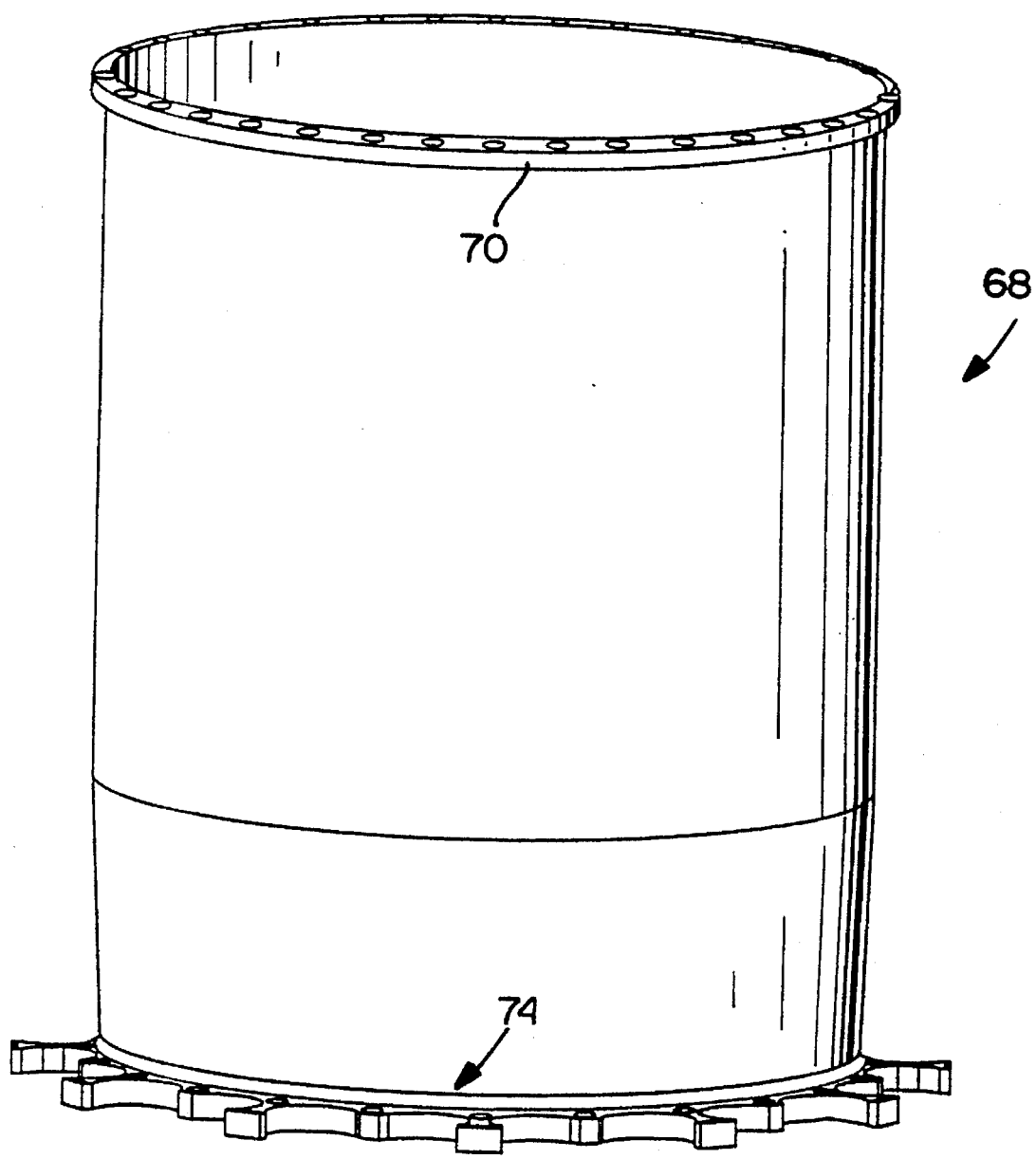
FIG. 6 is a perspective view of a removable retrofit shroud in accordance with a secondary exemplary embodiment of the invention.

Turning now to FIGS. 5 and 6, there are shown various design modifications to accommodate existing permanent shrouds. FIG. 5, for example, shows a retrofit shroud 62 in accordance with the invention, formed with an enlarged upper end 64 and an internal ledge 66 for a specific application. FIG. 6 illustrates a retrofit shroud 68 in accordance with the invention, incorporating an upper end 70 which enables the shroud 68 to be used in another reactor core configuration. These retrofit shrouds incorporate lower mounting rings 72 and 74, respectively, which are similar to the earlier described mounting ring 36. It will be appreciated that the invention is equally applicable to any number of shroud configurations.

In all cases, the retrofit shroud configuration permits future repair/removal from the core via remote tooling. In addition, since virtually all potentially problematic horizontal welds are now removable along with the shroud, repair of such welds is also greatly facilitated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a pressure vessel of a nuclear reactor containing a core assembly enclosed within a core shroud, the core shroud spaced radially inwardly of a side wall of the pressure vessel with an annular pump deck welded in a place in an annular radial space between the core shroud and the side wall of the pressure vessel, the improvement wherein the shroud is provided with a radially outwardly directed flange ring at a lower end of the shroud, said flange ring provided with a plurality of annularly spaced holes for receiving a corresponding number of fasteners used to secure the shroud to said pump deck, and wherein a plurality of wedge supports are fixed to said flange ring and at least a corresponding plurality of wedge elements are adapted to be engaged between said wedge supports and said side wall of the pressure vessel.

2. The improvement of claim 1 wherein said flange ring is also supported on an annular support leg extending upwardly from a bottom wall of the pressure vessel.

3. The improvement of claim 1 wherein said annular flange ring has a scalloped outer edge.

4. The improvement of claim 3 wherein said scalloped outer edge includes a first plurality of alternating flange portions which extend radially outwardly to a location proximate the side wall of the pressure vessel, and a second plurality of alternating relatively shorter flange portions extending radially outwardly approximately half way to said side wall.

5. In a pressure vessel of a nuclear reactor containing a core assembly enclosed within a core shroud, the core shroud spaced radially inwardly of a side wall of the pressure vessel with an annular pump deck welded in a place in an annular radial space between the core shroud and the side wall of the pressure vessel, the improvement wherein the shroud is provided with a radially outwardly extending flange at a lower end thereof, said flange seated on said pump deck and having portions extending to locations proximate the side wall of the reactor vessel; and further wherein a plurality of wedge elements are interposed between said portions and said side wall.

6. The improvement of claim 5 wherein each wedge element of said plurality of wedge elements cooperates with a tapered recess in a respective one of said flange portions.

7. The improvement of claim 6 wherein each wedge element includes a lifting bail.

8. The improvement of claim 5 and including a plurality of fasteners for securing said radially outwardly extending flange to said pump deck.

* * * * *